United States Patent
Voronov (10) Patent No.: US 9,083,887 B2
(45) Date of Patent: Jul. 14, 2015

(54) IMAGE CAPTURE DEVICES CONFIGURED TO GENERATE COMPENSATION GAINS BASED ON AN OPTIMUM LIGHT MODEL AND ELECTRONIC APPARATUS HAVING THE SAME

(71) Applicant: Samsung Electronics Co., Ltd., Suwon-si (KR)

(72) Inventor: German Voronov, Holon (IL)

(73) Assignee: Samsung Electronics Co., Ltd. (KR)

( * ) Notice: Subject to any disclaimer, the term of this patent is extended or adjusted under 35 U.S.C. 154(b) by 129 days.

(21) Appl. No.: 13/858,525

(22) Filed: Apr. 8, 2013

(65) Prior Publication Data

US 2014/0300773 A1 Oct. 9, 2014

(51) Int. Cl.
*H04N 5/235* (2006.01)
*H04N 5/243* (2006.01)
*H04N 5/353* (2011.01)

(52) U.S. Cl.
CPC ........... *H04N 5/2353* (2013.01); *H04N 5/2357* (2013.01); *H04N 5/243* (2013.01); *H04N 5/3535* (2013.01)

(58) Field of Classification Search
CPC .................................................. H04N 5/2353
USPC .............................................. 348/221.1, 362
See application file for complete search history.

(56) References Cited

U.S. PATENT DOCUMENTS

| | | | |
|---|---|---|---|
| 2003/0030744 A1* | 2/2003 | Baer | 348/370 |
| 2004/0090538 A1* | 5/2004 | Kadohara | 348/230.1 |
| 2006/0290797 A1* | 12/2006 | Tanaka et al. | 348/297 |
| 2007/0052816 A1 | 3/2007 | Nomura et al. | |
| 2007/0153094 A1* | 7/2007 | Noyes et al. | 348/226.1 |
| 2010/0053369 A1* | 3/2010 | Nagai | 348/226.1 |
| 2010/0259654 A1* | 10/2010 | Sugeno | 348/255 |
| 2012/0236175 A1* | 9/2012 | Kinrot | 348/226.1 |

FOREIGN PATENT DOCUMENTS

| | | |
|---|---|---|
| JP | 2006-245784 A | 9/2006 |
| KR | 10-2007-0029071 A | 3/2007 |
| KR | 10-2009-0098498 A | 9/2009 |

* cited by examiner

*Primary Examiner* — Usman Khan
(74) *Attorney, Agent, or Firm* — Myers Bigel Sibley & Sajovec, P.A.

(57) ABSTRACT

An image capture device can include an analysis unit that can be configured to determine a refined light model that models a light source based on first and second image signals sampled with first and second exposure times, respectively, and corresponding to first and second rows of pixels. A compensation unit can be coupled to the analysis unit, and can be configured to generate an output image signal by compensating the first and second image signals and the second image signal using compensation gains associated with the refined light model.

16 Claims, 5 Drawing Sheets

IMAGE CAPTURE DEVICES CONFIGURED TO GENERATE COMPENSATION GAINS BASED ON AN OPTIMUM LIGHT MODEL AND ELECTRONIC APPARATUS HAVING THE SAME

FIELD

Example embodiments relate to image processing, and more particularly to image capture.

BACKGROUND

In general, a digital camera electrically records two dimensional (2D) information about an object. The digital camera converts an optical image of the object into an electrical signal and stores the electrical signal in a memory.

The digital camera can use an image sensor circuit to convert an optical image into an electrical signal. The image sensor circuit conventionally can be based on a charge-coupled device (CCD) or a complementary metal oxide semiconductor (CMOS) image sensor circuit.

Light sources used by the image sensor circuit are mainly classified into sunlight and artificial light. A frequency of an alternating current (ac) power source used for artificial light, such as fluorescent lamp, differs by countries, but most countries use 50 Hz or 60 Hz.

The image sensor circuit includes a pixel array for capturing an image. The pixel array includes unit pixels arranged in rows and columns. When the unit pixels are exposed to light to capture an image, not all pixels may be exposed simultaneously due to concern over leakage current. Therefore, the image sensor circuit can sequentially be exposed on a row-by-row basis.

When an exposure time per row of an image sensor circuit is not an integer multiple of a period of a power used for a light source, flicker may occur in an output image. For example, when an image is captured at 60 Hz under lighting of a fluorescent lamp driven by a power having a frequency of 50 Hz, the light intensities reflected from the object may be different from row to row.

Conventionally, to remove flicker noise, the exposure time can be set to be an integer multiple of the period of the light source. However, because the frequency of the power source may differ by country, it may be inconvenient for the user to set the exposure time according to the frequency of the light source.

In addition, when the exposure time should be less than the period of the light source (e.g., when the light source is very bright), the exposure time may not be configured as an integer multiple of the period of the light source.

SUMMARY

Some example embodiments are directed to provide an electronic apparatus including an image capture device.

According to example embodiments, an image capture device includes an image sensor, an analysis unit and a compensation unit. The image sensor includes a pixel array having a plurality of unit pixels. Unit pixels included in first rows of the pixel array detect incident light originated from a light source during a first exposure time to generate a first image signal, and unit pixels included in second rows of the pixel array detect incident light originated from the light source during a second exposure time to generate a second image signal. The analysis unit determines an optimum light model that models the light source based on the first image signal and the second image signal, and generates compensation gains corresponding to rows of the pixel array, respectively, based on the optimum light model. The compensation unit generates an output image signal by compensating the first image signal and the second image signal using the compensation gains.

In example embodiments, the analysis unit may set a light model using light parameters, calculate a difference between the light source and the light model while varying the light parameters, and determine the light model that minimizes the difference between the light source and the light model as the optimum light model.

The analysis unit may adjust the first image signal based on the light model and the first exposure time, adjust the second image signal based on the light model and the second exposure time, determine an optimum light parameters that minimize a difference between the adjusted first image signal and the adjusted second image signal, and generate the compensation gains based on the optimum light parameters.

The analysis unit may set the light parameters as following equation, $P=[A0, A1, \ldots, AM, B1, B2, \ldots, BM]$, and set the light model as following equation, $$L(t) = A_0 + \sum_{k=1}^{M} A_k \cos(2 \cdot \pi \cdot k \cdot f \cdot t + B_k),$$

where P is the light parameters, and M is a positive integer.

In example embodiments, the analysis unit may comprise a row average unit configured to calculate average values of the first image signals for each of the first rows and average values of the second image signals for each of the second rows, and to generate a row average vector having entries corresponding to the average values for the first rows and the second rows, the size of the row average vector being a number of rows of the pixel array, an interpolation unit configured to generate a first average vector by separating entries corresponding to the first rows from the row average vector and performing an interpolation on the separated entries, and to generate a second average vector by separating entries corresponding to the second rows from the row average vector and performing an interpolation on the separated entries, the first average vector and the second average vector having a same size as the row average vector, an optimization unit configured to set a light model using light parameters, to generate a first adjusted vector by adjusting entries of the first average vector based on the light model and the first exposure time, to generate a second adjusted vector by adjusting entries of the second average vector based on the light model and the second exposure time, and to determine an optimum light parameters that minimizes a difference between the first adjusted vector and the second adjusted vector, and a compensation gain generation unit configured to generate the compensation gains based on the optimum light parameters.

The row average unit may calculate the average values using image signals representing a predetermined color among the first image signals and the second image signals.

The optimization unit may generate the first adjusted vector by dividing each entry of the first average vector by an integrated value of the light model during the first exposure time in a corresponding row and multiplying a first gain value, and generate the second adjusted vector by dividing each entry of the second average vector by an integrated value of the light model during the second exposure time in a corresponding row and multiplying a second gain value.

The optimization unit may determine the light parameters that minimize a value of k-norm function of a difference between the first adjusted vector and the second adjusted vector as the optimum light parameters, where k is a positive integer.

The compensation gain generation unit may determine the optimum light model using the optimum light parameters, determine the compensation gains for the first rows by dividing a third gain value by an integrated value of the optimum light model during the first exposure time in a corresponding row, and determine the compensation gains for the second rows by dividing a fourth gain value by an integrated value of the optimum light model during the second exposure time in a corresponding row.

In example embodiments, the compensation unit may generate the output image signal by multiplying the first image signal with a compensation gain corresponding to a row of the pixel array from which the first image signal is generated and multiplying the second image signal with a compensation gain corresponding to a row of the pixel array from which the second image signal is generated.

In example embodiments, the pixel array may further comprise a rolling shutter exposing the unit pixels in a unit of a row, and the image sensor may further comprise a control unit configured to control the rolling shutter to expose unit pixels included in the first rows of the pixel array during the first exposure time and to expose unit pixels included in the second rows of the pixel array during the second exposure time, and a frame memory configured to store the first image signal and the second image signal in a unit of a frame.

In example embodiments, the first rows may correspond to odd rows of the pixel array and the second rows may correspond to even rows of the pixel array.

According to example embodiments, an electronic apparatus comprises an image capture device that detects incident light to generate an output image signal, a storage unit that stores the output image signal, and a processor that controls the image capture device and the storage unit. The image capture device comprises an image sensor, an analysis unit and a compensation unit. The image sensor includes a pixel array having a plurality of unit pixels. Unit pixels included in first rows of the pixel array detect incident light originated from a light source during a first exposure time to generate a first image signal, and unit pixels included in second rows of the pixel array detect incident light originated from the light source during a second exposure time to generate a second image signal. The analysis unit determines an optimum light model that models the light source based on the first image signal and the second image signal, and generates compensation gains corresponding to rows of the pixel array, respectively, based on the optimum light model. The compensation unit generates an output image signal by compensating the first image signal and the second image signal using the compensation gains.

In example embodiments, the analysis unit may set a light model using light parameters, calculate a difference between the light source and the light model while varying the light parameters, and determine the light model that minimizes the difference between the light source and the light model as the optimum light model.

The analysis unit may adjust the first image signal based on the light model and the first exposure time, adjust the second image signal based on the light model and the second exposure time, determine an optimum light parameters that minimize a difference between the adjusted first image signal and the adjusted second image signal, and generate the compensation gains based on the optimum light parameters.

In some embodiments, an image capture device can include an analysis unit that can be configured to determine a refined light model that models a light source based on first and second image signals sampled with first and second exposure times, respectively, and corresponding to first and second rows of pixels. A compensation unit can be coupled to the analysis unit, and can be configured to generate an output image signal by compensating the first and second image signals and the second image signal using compensation gains associated with the refined light model.

DETAILED DESCRIPTION OF THE EMBODIMENTS

Various example embodiments will be described more fully with reference to the accompanying drawings, in which some example embodiments are shown. The present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
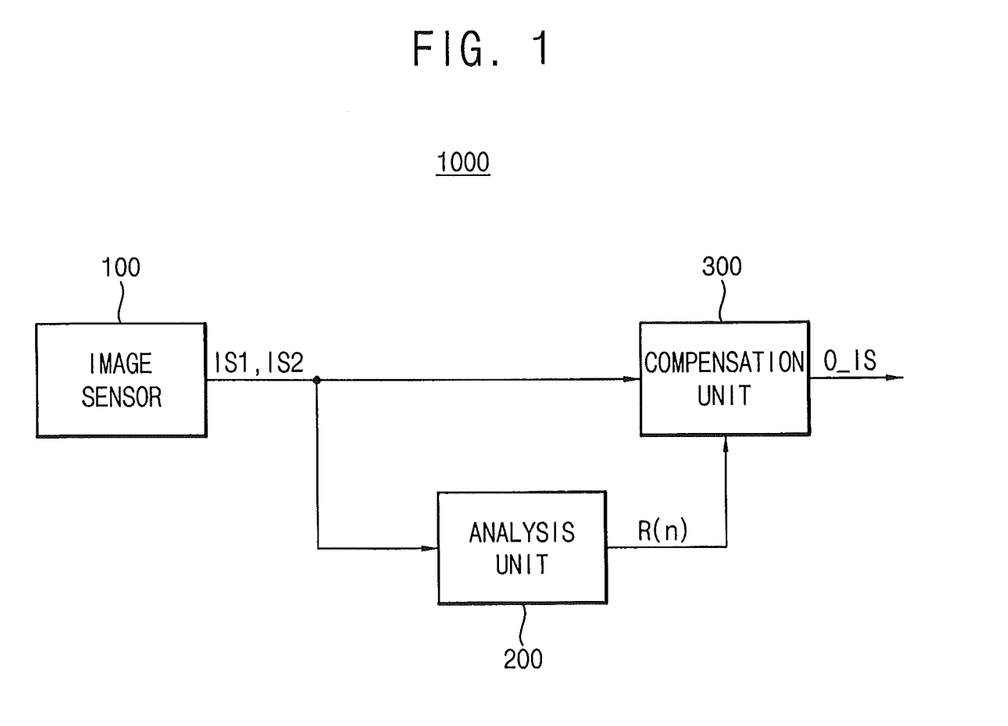
FIG. 1 is a block diagram illustrating an image capture device according to example embodiments.

FIG. 1 is a block diagram illustrating an image capture device according to example embodiments.

The term "refined light model" is used herein to include implementations that optimize the model as well as implementations that improve the light model, but may not necessarily optimize that model.

Referring to FIG. 1, an image capture device 1000 includes an image sensor circuit 100, an analysis unit 200 and a compensation unit 300.

The image sensor circuit 100 includes a pixel array having a plurality of unit pixels arranged in rows and columns. Each of the unit pixels detects incident light originated from a light source to generate an image signal IS1 and IS2. The incident light may include a light signal generated from the light source and reflected from an object. Therefore, the image sensor circuit 100 may convert the incident light into an electrical signal to generate the image signal IS1 and IS2 representing the object.

Figure 2:
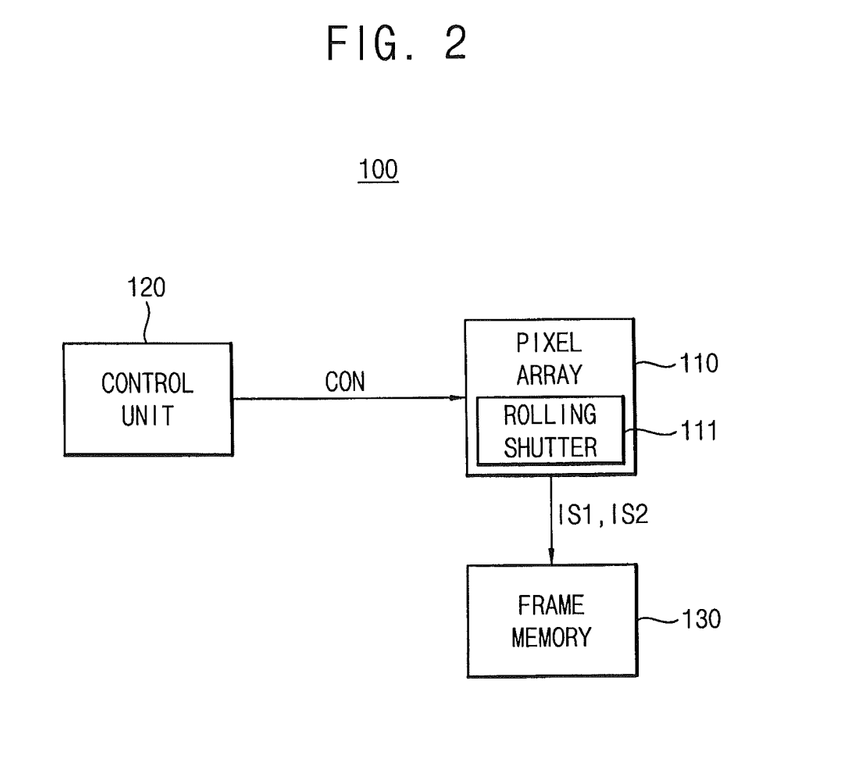
FIG. 2 is a block diagram illustrating an example of an image sensor circuit included in the image capture device of FIG. 1.

FIG. 2 is a block diagram illustrating an example of an image sensor circuit included in the image capture device of FIG. 1.

Referring to FIG. 2, the image sensor circuit 100 may include a pixel array 110, a control unit 120 and a frame memory 130.

The pixel array 110 may include the plurality of unit pixels arranged in rows and columns and a rolling shutter 111 that exposes the unit pixels to incident light in a unit of a row (i.e., on a row-by-row basis).

The control unit 120 may control the rolling shutter 111 by providing a control signal CON to the rolling shutter 111 so that the rolling shutter 111 exposes unit pixels included in first rows of the pixel array 110 during a first exposure time and exposes unit pixels included in second rows of the pixel array 110 during a second exposure time and so on. The first exposure time and the second exposure time may be set as arbitrary times so that the first exposure time and the second exposure time have no relation with each other.

The pixel array 110 may operate in a unit of a row under control of the control unit 120. For example, unit pixels included in the first rows of the pixel array 110 may detect incident light originated from the light source during the first exposure time to generate a first image signal IS1, and unit pixels included in the second rows of the pixel array 110 may detect incident light originated from the light source during the second exposure time to generate a second image signal IS2.

The frame memory 130 may store the first image signal IS1 and the second image signal IS2 provided from the pixel array 110 in a unit of a frame.

In some example embodiments, the first rows may correspond to odd rows of the pixel array 110 and the second rows may correspond to even rows of the pixel array 110.

Figure 3:
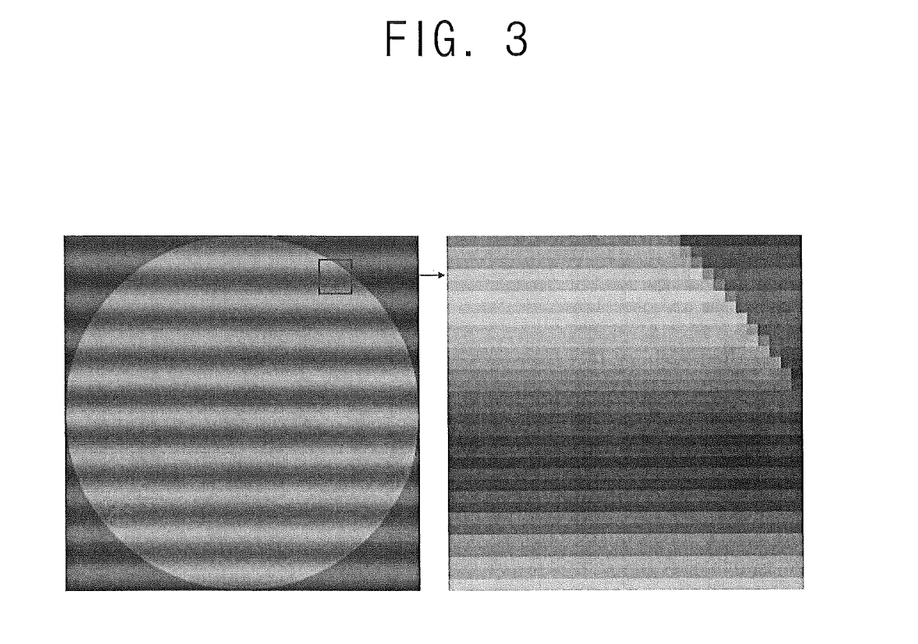
FIG. 3 is a picture illustrating an example of an image captured by an image sensor circuit of FIG. 2.

FIG. 3 is a picture illustrating an image captured by an image sensor circuit of FIG. 2.

In FIG. 3, the light source is a fluorescent lamp operated by an alternating current (ac) power source having a characteristic frequency (which can also be expressed as a time period). The image of FIG. 3 may be stored in the frame memory 130.

As described above, the image sensor circuit 100 may sequentially expose unit pixels of the pixel array 110 in a unit of a row. Therefore, if the first exposure time and the second exposure time are not integer multiples of the period of the ac power source, flicker may occur in the output image, as illustrated in FIG. 3 as the horizontal bars.

As illustrated in FIG. 3, since the first exposure time during which unit pixels included in the first rows of the pixel array 110 are exposed and the second exposure time during which unit pixels included in the second rows of the pixel array 110 are exposed are different, a luminance of the first image signal IS1 generated from a first row and a luminance of the second image signal IS2 generated from a second row adjacent to the first row may be different.

Referring again to FIG. 1, the analysis unit 200 determines a refined light model that models the light source based on the first image signal IS1 and the second image signal IS2. For example, the analysis unit 200 may set a light model using light parameters, calculate a difference between the light source and the light model while varying the light parameters, and determine the light model that minimizes the difference between the light source and the light model as the refined light model. The analysis unit 200 may set the light model in various ways.

The analysis unit 200 generates compensation gains R(n) corresponding to rows of the pixel array 110, respectively, based on the light model.

In some example embodiments, the analysis unit 200 may adjust the first image signal IS1 based on the light model and the first exposure time, adjust the second image signal IS2 based on the light model and the second exposure time, and determine an optimum light parameters that minimize a difference between the adjusted first image signal and the adjusted second image signal. The refined light model may be determined by applying the optimum light parameters to the light model. The analysis unit 200 may generate the compensation gains R(n) based on the optimum light parameters.

Figure 4:
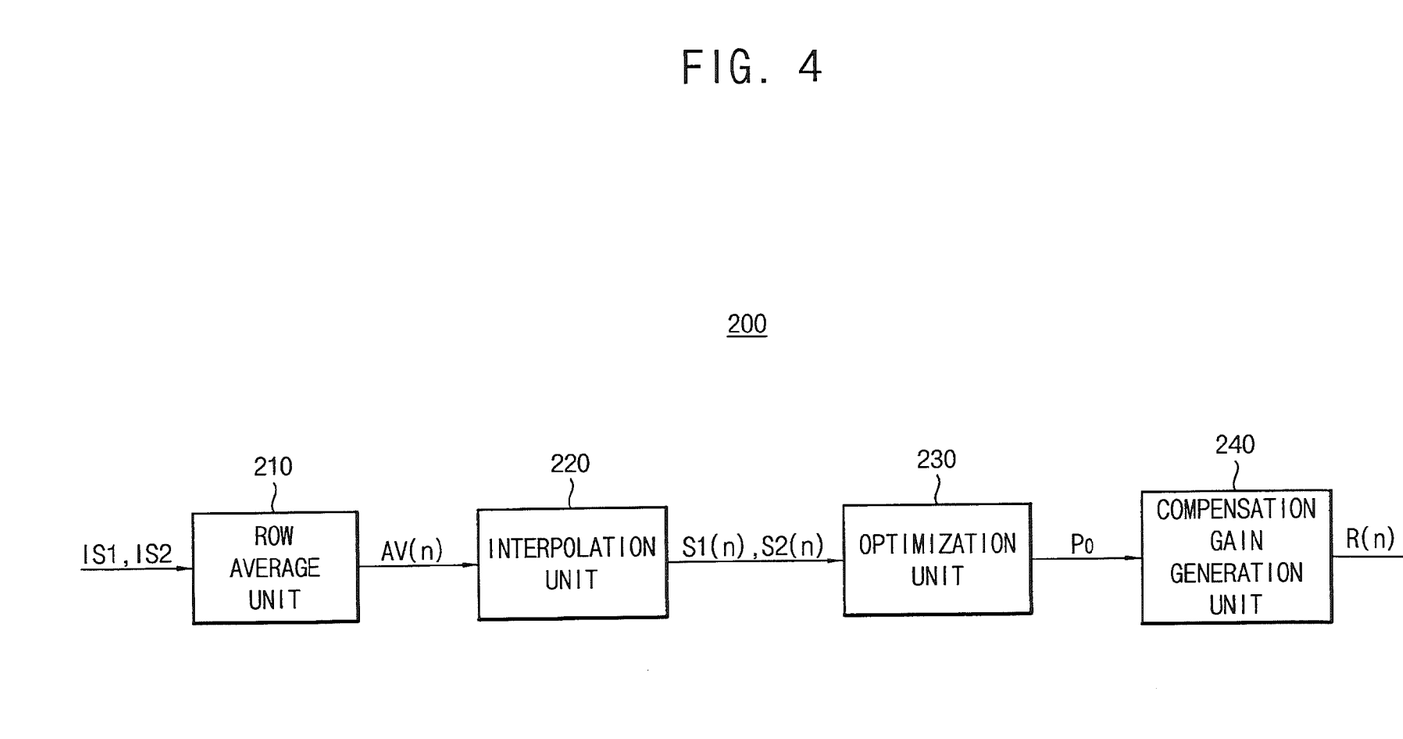
FIG. 4 is a block diagram illustrating an example of an analysis unit included in the image capture device of FIG. 1.

FIG. 4 is a block diagram illustrating an example of an analysis unit included in the image capture device of FIG. 1.

Referring to FIG. 4, the analysis unit 200 may include a row average unit 210, an interpolation unit 220, an optimization unit 230 and a compensation gain generation unit 240.

The row average unit 210 may calculate average values of the first image signals IS1 for each of the first rows and average values of the second image signals IS2 for each of the second rows, and generate a row average vector AV(n) having entries corresponding to the average values for the first rows and the second rows. Therefore, the size of the row average vector AV(n) may be a number of rows of the pixel array 110.

If the image sensor circuit 100 provides colored image data, the row average unit 210 may calculate the average values using only image signals representing a predetermined color (e.g., green color) among the first image signals IS1 and the second image signals IS2.

The row average unit 210 may calculate the average values using various methods such as an arithmetic mean, a geometric mean, a harmonic mean, etc. Other methods may be used.

Figure 5:
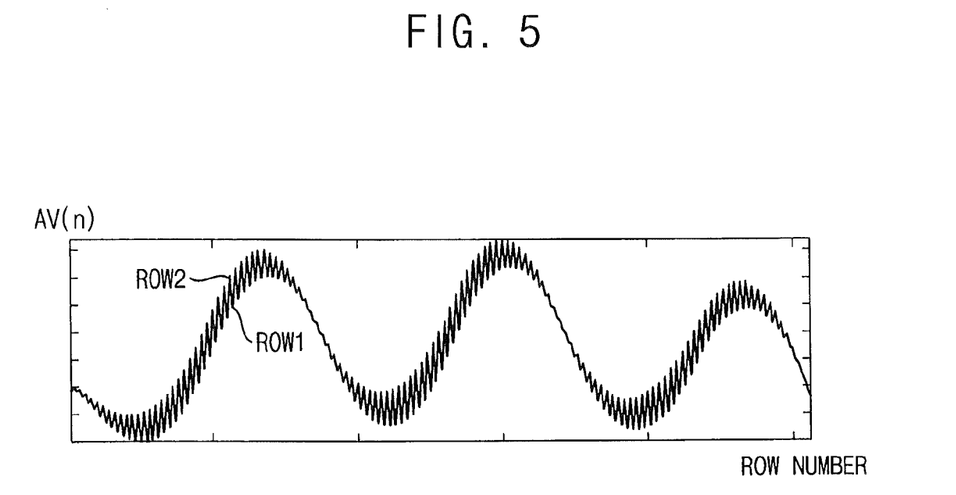
FIG. 5 is a graph describing operations of a row average unit of FIG. 4.

FIG. 5 is a graph illustrating operations of a row average unit of FIG. 4.

In FIG. 5, the x-axis represents a row number of the pixel array 110 and the y-axis represents an entry of the row average vector AV(n), which corresponds to an average value of a respective row.

In FIG. 5, the first exposure time is shorter than the second exposure time.

Since the image data stored in the frame memory 130 includes flicker noise, as illustrated in FIG. 5, assuming the light source used to provide the image data is substantially constant, the average values of rows included in the row average vector AV(n) varies as a sine wave as the row number increases. In addition, since the first exposure time is shorter than the second exposure time, an average value of a first row ROW1 is smaller than an average value of an adjacent second row ROW2.

Referring again to FIG. 4, the interpolation unit 220 may generate a first average vector S1(n) by separating entries corresponding to the first rows from the row average vector AV(n) and performing an interpolation on the separated entries, and generate a second average vector S2(n) by separating entries corresponding to the second rows from the row average vector AV(n) and performing an interpolation on the separated entries. Therefore, the size of the first average vector S1(n) and the size of the second average vector S2(n) may be the same as the size of the row average vector AV(n), which is the number of rows of the pixel array 110.

For example, the interpolation unit 220 may generate the first average vector S1(n) and the second average vector S2(n) using a linear interpolation. However, according to example embodiments, the interpolation unit 220 may use various interpolation methods to generate the first average vector S1(n) and the second average vector S2(n).

Figure 6:
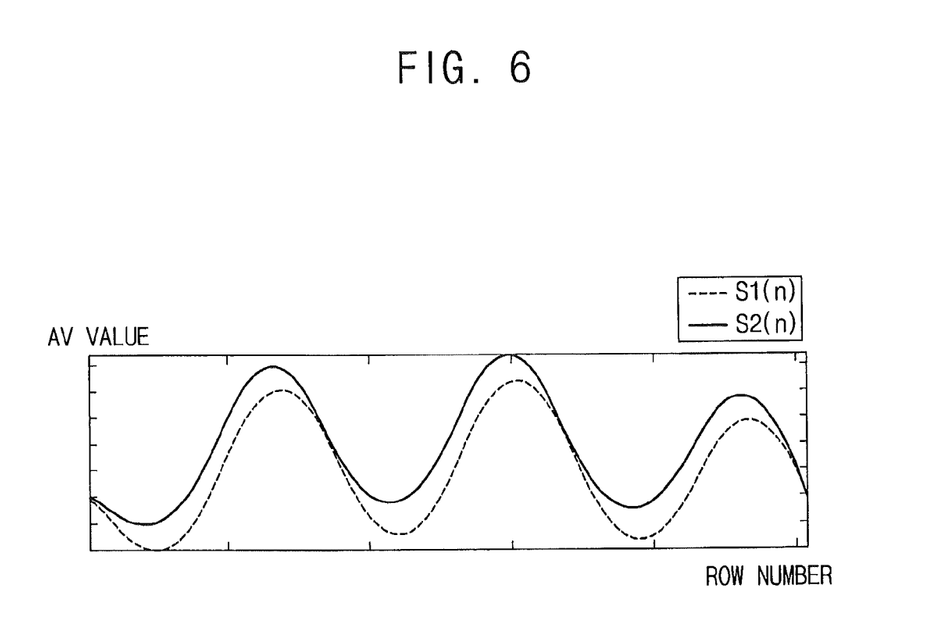
FIG. 6 is a graph describing operations of an interpolation unit of FIG. 4.

FIG. 6 is a graph illustrating operations of an interpolation unit of FIG. 4.

In FIG. 6, the x-axis represents a row number of the pixel array 110 and the y-axis represents an entry of the first average vector S1(n) and the second average vector S2(n).

FIG. 6 represents the first average vector S1(n) and the second average vector S2(n) generated by the interpolation unit 220 using the row average vector AV(n) of FIG. 5.

As illustrated in FIG. 6, since the first exposure time is shorter than the second exposure time, each entry of the first average vector S1(n) may be less than a corresponding entry of the second average vector S2(n).

Referring again to FIG. 4, the optimization unit 230 may set the light model using light parameters.

Figure 7:
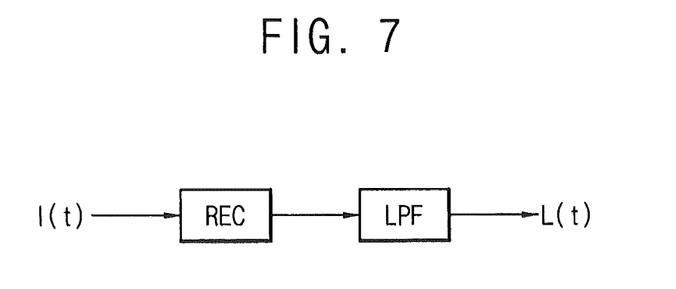
FIG. 7 is a block diagram describing operations of an optimization unit of FIG. 4.

FIG. 7 is a block diagram illustrating operations of an optimization unit of FIG. 4.

Generally, as illustrated in FIG. 7, a fluorescent lamp receives an alternating current I(t) from an ac power source, rectifies the alternating current I(t) using a rectifier REC, and generates a light signal L(t) by filtering the rectified current using a first order low-pass filter LPF. The alternating current I(t) may be represented as Equation 1.

$$I(t) = a \cdot \cos(2 \cdot \pi \cdot f \cdot t \cdot c) + b \quad \text{[Equation 1]}$$

In Equation 1, a, b and c represent real numbers, and f represents a frequency of the ac power.

If the light source is the fluorescent lamp operated by the ac power source, the optimization unit 230 may set the light parameters P according to Equation 2, and set the light model L(t) using the light parameters P according to Equation 3.

$$P = [A0, A1, \ldots, AM, B1, B2, \ldots, BM] \quad \text{[Equation 2]}$$

$$L(t) = A_0 + \sum_{k=1}^{M} A_k \cos(2 \cdot \pi \cdot k \cdot f \cdot t + B_k) \quad \text{[Equation 3]}$$

In Equation 2 and 3, M represents a positive integer.

As M increases, the optimization unit 230 may control the light model L(t) more finely.

However, embodiments are not limited thereto, and according to example embodiments, the optimization unit 230 may set the light model L(t) in various ways.

After setting the light parameters P and the light model L(t), the optimization unit 230 may generate a first adjusted vector C1(n) by adjusting entries of the first average vector S1(n) based on the light model L(t) and the first exposure time, and generate a second adjusted vector C2(n) by adjusting entries of the second average vector S2(n) based on the light model L(t) and the second exposure time.

In some example embodiments, as represented in Equation 4, the optimization unit 230 may generate the first adjusted vector C1(n) by dividing each entry of the first average vector S1(n) by an integrated value of the light model L(t) during the first exposure time in a corresponding row and multiplying a first gain value. Similarly, as represented in Equation 5, the optimization unit 230 may generate the second adjusted vector C2(n) by dividing each entry of the second average vector S2(n) by an integrated value of the light model L(t) during the second exposure time in a corresponding row and multiplying a second gain value.

$$C1(n) = S1(n) \cdot \frac{\max_n L_{T1}(n)}{L_{T1}(n)}, \quad \text{[Equation 4]}$$

where $$L_{T1}(n) = \int_{t_0 + D \cdot N}^{t_0 + D \cdot N + T1} L(\tau) d\tau$$

$$C2(n) = S2(n) \cdot \frac{\max_n L_{T2}(n)}{L_{T2}(n)}, \quad \text{[Equation 5]}$$

where $$L_{T2}(n) = \int_{t_0 + D \cdot N}^{t_0 + D \cdot N + T2} L(\tau) d\tau$$

In Equation 4 and 5, $t_0$ represents a time when a first row of the pixel array 110 is exposed to incident light, D represents a read time interval between consecutive rows (that is, a read time per row), n represents a row number of the pixel array 110, T1 represents the first exposure time and T2 represents the second exposure time.

In Equation 4, the first gain value is set as a maximum value among the integrated values of the light model L(t) during the first exposure time in a corresponding row. In Equation 5, the second gain value is set as a maximum value among the integrated values of the light model L(t) during the second exposure time in a corresponding row.

If the light model L(t) is set to be the same as the light source by selecting appropriate light parameters P, a difference between the first adjusted vector C1(n) and the second adjusted vector C2(n) may be minimized. Therefore, the optimization unit 230 may determine the optimum light parameters that minimize the difference between the first adjusted vector C1(n) and the second adjusted vector C2(n).

In some example embodiments, as represented in Equation 6, the optimization unit 230 may calculate a value of k-norm function of a difference between the first adjusted vector C1(n) and the second adjusted vector C2(n), and determine the light parameters that minimize the value of the k-norm function of the difference between the first adjusted vector C1(n) and the second adjusted vector C2(n) as the optimum light parameters $P_0$. Here, k represents a positive integer.

$$P_0 = \arg\left(\min_{p \in P} \|C1_p(n) - C2_p(n)\|_k\right), \qquad \text{[Equation 6]}$$

where $$\|\bar{x}\|_k = \left(\sum_i |x_i|^k\right)^{1/k}.$$

In Equation 6, $C1_p(n)$ represents the first adjusted vector when the light parameter is P, and $C2_p(n)$ represents the second adjusted vector when the light parameter is P.

Since the k-norm function of the difference between the first adjusted vector C1(n) and the second adjusted vector C2(n) is a smooth periodic function, the optimum light parameters $P_0$ may be determined using various optimization methods such as brute-force algorithm, gradient descent algorithm, simplex algorithm, etc. Other methods may be used.

Referring again to FIG. 4, the compensation gain generation unit 240 may generate the compensation gains R(n), which correspond to rows of the pixel array 110, respectively, based on the optimum light parameters $P_0$.

In some example embodiments, the compensation gain generation unit 240 may determine the refined light model $L_{P0}(t)$ using the optimum light parameters $P_0$. After that, as represented in Equation 7, the compensation gain generation unit 240 may determine the compensation gains R(n) for the first rows by dividing a third gain value by an integrated value of the refined light model $L_{P0}(t)$ during the first exposure time in a corresponding row. Similarly, as represented in Equation 8, the compensation gain generation unit 240 may determine the compensation gains R(n) for the second rows by dividing a fourth gain value by an integrated value of the refined light model $L_{P0}(t)$ during the second exposure time in a corresponding row.

$$R(n) = \frac{\max_n L_{Po,T1}(n)}{L_{Po,T1}(n)}, \qquad \text{[Equation 7]}$$

where $$L_{Po,T1}(n) = \int_{t_0+D\cdot n}^{t_0+D\cdot n+T1} L_{Po}(\tau)d\tau \quad (\text{if } n \in \text{Row1})$$

$$R(n) = \frac{\max_n L_{Po,T2}(n)}{L_{Po,T2}(n)}, \qquad \text{[Equation 8]}$$

where $$L_{Po,T2}(n) = \int_{t_0+D\cdot n}^{t_0+D\cdot n+T2} L_{Po}(\tau)d\tau \quad (\text{if } n \in \text{Row2})$$

In Equation 7 and 8, Row1 represents the first rows of the pixel array 110 and Row2 represents the second rows of the pixel array 110.

In Equation 7, the third gain value is set as a maximum value among the integrated values of the refined light model $L_{P0}(t)$ during the first exposure time in a corresponding row. In Equation 8, the fourth gain value is set as a maximum value among the integrated values of the refined light model $L_{P0}(t)$ during the second exposure time in a corresponding row.

Referring again to FIG. 1, the compensation unit 300 generates an output image signal O_IS by compensating the first image signal IS1 and the second image signal IS2 received from the image sensor circuit 100 using the compensation gains R(n).

In some example embodiments, the compensation unit 300 may generate the output image signal O_IS by multiplying the first image signal IS1 with a compensation gain among the compensation gains R(n) corresponding to a row of the pixel array 110 from which the first image signal IS1 is generated and multiplying the second image signal IS2 with a compensation gain among the compensation gains R(n) corresponding to a row of the pixel array 110 from which the second image signal IS2 is generated. For example, if the first image signal IS1 or the second image signal IS2 is generated from an unit pixel included in an i-th row of the pixel array 110, the compensation unit 300 may generate the output image signal O_IS by multiplying the first image signal IS1 or the second image signal IS2 with a compensation gain R(i) among the compensation gains R(n) corresponding to the i-th row of the pixel array 110.

As described above, in the image capture device 1000 according to embodiments of the inventive concept, unit pixels included in the first rows of the pixel array 110 may detect incident light originated from the light source during the first exposure time to generate the first image signal IS1, and unit pixels included in the second rows of the pixel array 110 may detect incident light originated from the light source during the second exposure time to generate the second image signal IS2. The analysis unit 200 may set the light model L(t) using the light parameters P, determine the light parameters $P_0$ that minimizes (or reduces) the difference between the light source and the light model L(t) using the first image signal IS1, the second image signal IS2, the first exposure time and the second exposure time, determine the light model $L_{P0}(t)$ by applying the light parameters $P_0$ to the light model L(t), generate the compensation gains R(n), which correspond to rows of the pixel array 110, respectively, using the light model $L_{P0}(t)$. The compensation unit 300 may generate the output image signal O_IS by compensating the first image signal IS1 and the second image signal IS2 using the compensation gains R(n).

Therefore, the image capture device 1000 may effectively reduce flicker noise regardless of a frequency of the supply power used by the light source and without setting the exposure time to be an integer multiple of a period of the supply power.

Figure 8:
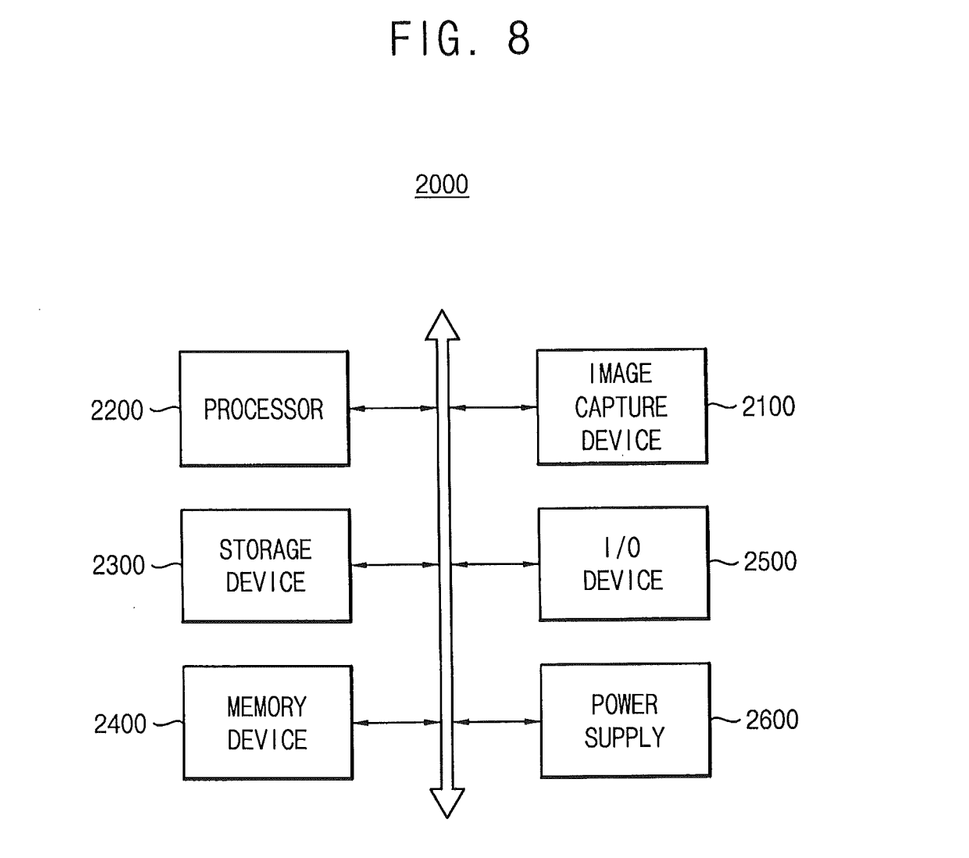
FIG. 8 is a block diagram illustrating an electronic apparatus according to example embodiments.

FIG. 8 is a block diagram illustrating an electronic apparatus according to example embodiments.

Referring to FIG. 8, an electronic apparatus 2000 includes an image capture device 2100, a processor 2200 and a storage device 2300.

The image capture device 2100 generates an output image signal corresponding to incident light. The storage device 2300 stores the output image signal generated by the image capture device 2100. The processor 2200 controls operations of the image capture device 2100 and the storage device 2300.

The electronic apparatus 2000 may further include a memory device 2400, an input/output device 2500 and a power supply 2600. Although not illustrated in FIG. 8, the electronic apparatus 2000 may further include ports to communicate with a video card, a sound card, a memory card, a universal serial bus (USB) device, etc.

The processor 2200 may perform various computing functions, such as executing specific software for performing specific calculations or tasks. For example, the processor 2200 may be a microprocessor or a central processor unit. The processor 2200 may be connected to the storage device 2300, the memory device 2400 and the input/output device 2500 via a bus, such as an address bus, a control bus or a data bus, etc. The processor 2200 may be connected to an extended bus, such as peripheral component interconnect (PCI) bus.

The storage device 2300 may include a solid state drive, a flash memory device, a hard disk drive, a compact disk read-only memory (CD-ROM) drive, etc.

The memory device 2400 may be a dynamic random access memory (DRAM), a static random access memory (SRAM), or a non-volatile memory, such as an erasable programmable read-only memory (EPROM), an electrically erasable programmable read-only memory (EEPROM), a flash memory, etc.

The input/output device 2500 may include a keyboard, a mouse, a printer, a display device, etc. The power supply 2600 may supply operational power.

The image capture device 2100 communicates with the processor 2200 via a bus. The image capture device 2100 includes an image sensor circuit, an analysis unit and a compensation unit.

The image sensor circuit includes a pixel array having a plurality of unit pixels arranged in rows and columns. Unit pixels included in first rows of the pixel array detects incident light originated from a light source during a first exposure time to generate a first image signal, and unit pixels included in second rows of the pixel array detects incident light originated from the light source during a second exposure time to generate a second image signal. The analysis unit determines a light model that models the light source based on the first image signal and the second image signal and generates compensation gains corresponding to rows of the pixel array, respectively, based on the light model. The compensation unit generates the output image signal by compensating the first image signal and the second image signal using the compensation gains.

The image capture device 2100 may be embodied with the image capture device 1000 of FIG. 1. The structures and operations of the image capture device 1000 of FIG. 1 are as described herein.

In some embodiments according to the inventive concept, the image capture device 2100 may be integrated in a chip with the processor 2200. In other embodiments, the image capture device 2100 and the processor 2200 may be integrated in separate chips. The electronic apparatus 2000 may be any system that includes an image capture device, such as a digital camera, a camcorder, a smart phone, a personal computer, a laptop computer, a personal digital assistant, etc.

The foregoing is illustrative of the present inventive concept and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed:

1. An image capture device, comprising:
    an image sensor including a pixel array having a plurality of unit pixels, unit pixels included in first rows of the pixel array detecting incident light originated from a light source during a first exposure time to generate a first image signal, unit pixels included in second rows of the pixel array detecting incident light originated from the light source during a second exposure time to generate a second image signal;
    an analysis unit configured to determine an optimum light model that models the light source based on the first image signal and the second image signal, and to generate compensation gains corresponding to rows of the pixel array, respectively, based on the optimum light model and configured to compensate for flicker associated with a frequency of the incident light;
    a compensation unit configured to generate an output image signal by compensating the first image signal and the second image signal using the compensation gains, wherein the analysis unit sets a light model using light parameters, calculates a difference between the light source and the light model while varying the light parameters, and determines the light model that minimizes the difference between the light source and the light model as the optimum light model; and
    wherein the analysis unit sets the light parameters using, P =[A0, A1, . . ., AM, B1, B2, . . ., BM], and
    sets the light model L(t) using, $$L(t) = A_0 + \sum_{k=1}^{M} A_k \cos(2 \cdot \pi \cdot k \cdot f \cdot t + B_k),$$

where P is the light parameters, and M is a positive integer from 1 to any upper limit provided, t is time, and f is the frequency.

2. The image capture device of claim 1, wherein the analysis unit adjusts the first image signal based on the light model and the first exposure time, adjusts the second image signal based on the light model and the second exposure time, determines an optimum light parameters that minimize a difference between the adjusted first image signal and the adjusted second image signal, and generates the compensation gains based on the optimum light parameters.

3. The image capture device of claim 1, wherein the analysis unit comprises:
    a row average unit configured to calculate average values of the first image signals for each of the first rows and average values of the second image signals for each of the second rows, and to generate a row average vector having entries corresponding to the average values for the first rows and the second rows, the size of the row average vector being a number of rows of the pixel array;
    an interpolation unit configured to generate a first average vector by separating entries corresponding to the first rows from the row average vector and performing an interpolation on the separated entries, and to generate a second average vector by separating entries corresponding to the second rows from the row average vector and performing an interpolation on the separated entries, the first average vector and the second average vector having a same size as the row average vector;
    an optimization unit configured to set a light model using light parameters, to generate a first adjusted vector by adjusting entries of the first average vector based on the light model and the first exposure time, to generate a second adjusted vector by adjusting entries of the second average vector based on the light model and the second exposure time, and to determine an optimum light parameters that minimizes a difference between the first adjusted vector and the second adjusted vector; and a compensation gain generation unit configured to generate the compensation gains based on the optimum light parameters.

4. The image capture device of claim 3, wherein the row average unit calculates the average values using image signals representing a predetermined color among the first image signals and the second image signals.

5. The image capture device of claim 3, wherein the optimization unit generates the first adjusted vector by dividing each entry of the first average vector by an integrated value of the light model during the first exposure time in a corresponding row and multiplying a first gain value, and generates the second adjusted vector by dividing each entry of the second average vector by an integrated value of the light model during the second exposure time in a corresponding row and multiplying a second gain value.

6. The image capture device of claim 3, wherein the optimization unit determines the light parameters that minimize a value of k-norm function of a difference between the first adjusted vector and the second adjusted vector as the optimum light parameters, where k is a positive integer.

7. The image capture device of claim 3, wherein the compensation gain generation unit determines the optimum light model using the optimum light parameters, determines the compensation gains for the first rows by dividing a third gain value by an integrated value of the optimum light model during the first exposure time in a corresponding row, and determines the compensation gains for the second rows by dividing a fourth gain value by an integrated value of the optimum light model during the second exposure time in a corresponding row.

8. The image capture device of claim 1, wherein the compensation unit generates the output image signal by multiplying the first image signal with a compensation gain corresponding to a row of the pixel array from which the first image signal is generated and multiplying the second image signal with a compensation gain corresponding to a row of the pixel array from which the second image signal is generated.

9. The image capture device of claim 1, wherein the pixel array further comprises a rolling shutter exposing the unit pixels in a unit of a row, and wherein the image sensor further comprises:
    a control unit configured to control the rolling shutter to expose unit pixels included in the first rows of the pixel array during the first exposure time and to expose unit pixels included in the second rows of the pixel array during the second exposure time; and
    a frame memory configured to store the first image signal and the second image signal in a unit of a frame.

10. The image capture device of claim 1, wherein the first rows correspond to odd rows of the pixel array and the second rows correspond to even rows of the pixel array.

11. An electronic apparatus, comprising:
an image capture device configured to detect incident light to generate an output image signal;
a storage unit configured to store the output image signal; and
a processor configured to control the image capture device and the storage unit, wherein the image capture device comprises:
    an image sensor including a pixel array having a plurality of unit pixels, unit pixels included in first rows of the pixel array detecting incident light originated from a light source during a first exposure time to generate a first image signal, unit pixels included in second rows of the pixel array detecting incident light originated from the light source during a second exposure time to generate a second image signal;
    an analysis unit configured to determine an optimum light model that models the light source based on the first image signal and the second image signal, and to generate compensation gains corresponding to rows of the pixel array, respectively, based on the optimum light model and configured to compensate for flicker associated with a frequency of the incident light; and
    a compensation unit configured to generate the output image signal by compensating the first image signal and the second image signal using the compensation gains, wherein the analysis unit sets a light model using light parameters, calculates a difference between the light source and the light model while varying the light parameters, and determines the light model that minimizes the difference between the light source and the light model as the optimum light model; and wherein the analysis unit sets the light parameters using,
P =[A0, A1, . . ., AM, B1, B2, . . ., BM], and
sets the light model L(t)

$$L(t) = A_0 + \sum_{k=1}^{M} A_k \cos(2 \cdot \pi \cdot k \cdot f \cdot t + B_k),$$

where P is the light parameters and M is a positive integer from 1 to an upper limit provided, t is time, and f is the frequency.

12. The electronic apparatus of claim 11, wherein the analysis unit adjusts the first image signal based on the light model and the first exposure time, adjusts the second image signal based on the light model and the second exposure time, determines an optimum light parameters that minimizes a difference between the adjusted first image signal and the adjusted second image signal, and generates the compensation gains based on the optimum light parameters.

13. An image capture device, comprising:
an analysis unit configured to determine a refined light model that models a light source based on first and second image signals sampled with first and second exposure times, respectively, and corresponding to first and second rows of pixels; and
a compensation unit, coupled to the analysis unit, configured to generate an output image signal by compensating the first and second image signals using compensation gains associated with the refined light model and configured to compensate for flicker associated with a frequency of the light source, wherein the analysis unit sets a light model using light parameters, calculates a difference between the light source and the light model while varying the light parameters, and determines the light model that minimizes the difference between the light source and the light model as the optimum light model; and wherein the analysis unit sets the light parameters using,
P =[A0, A1, ..., AM, B1, B2, ..., BM], and
sets the light model L(t) using, $$L(t) = A_0 + \sum_{k=1}^{M} A_k \cos(2 \cdot \pi \cdot k \cdot f \cdot t + B_k),$$

where P is the light parameters, and M is a positive integer from 1 to any upper limit provided, t is time, and f is the frequency.

14. The image capture device of claim 13 further comprising:
an image sensor circuit including a pixel array including the first and second rows of the pixels, the image sensor circuit array configured to detect incident light originated from the light source during the first and second times to provide the first and second image signals.

15. The image capture device of claim 14 wherein the analysis unit is further configured to generate the compensation gains corresponding to the first and second rows of pixels based on the refined light model.

16. The image capture device of claim 13, wherein the analysis unit is configured to determine refined light parameters that reduce a difference between the first and second image signals adjusted based on the light model and the first and second exposure times, respectively.

* * * * *